(12) United States Patent
Doebele et al.

(10) Patent No.: US 8,118,708 B2
(45) Date of Patent: Feb. 21, 2012

(54) METHOD FOR CONTROLLING AN AUTOMATED FRICTION CLUTCH

(75) Inventors: Bernd Doebele, Salem (DE); Martin Miller, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 815 days.

(21) Appl. No.: 12/282,734

(22) PCT Filed: Feb. 27, 2007

(86) PCT No.: PCT/EP2007/051832
§ 371 (c)(1),
(2), (4) Date: Sep. 12, 2008

(87) PCT Pub. No.: WO2007/110292
PCT Pub. Date: Oct. 4, 2007

(65) Prior Publication Data
US 2009/0101464 A1 Apr. 23, 2009

(30) Foreign Application Priority Data
Mar. 28, 2006 (DE) .......... 10 2006 014 141

(51) Int. Cl.
*B60W 10/02* (2006.01)
*B60W 10/04* (2006.01)
(52) U.S. Cl. ........................ 477/176; 477/166
(58) Field of Classification Search ........... 477/166, 477/174, 176, 180; 192/85.15, 85.63, 89.23
See application file for complete search history.

(56) References Cited

U.S. PATENT DOCUMENTS

| | | | |
|---|---|---|---|
| 5,630,773 A | 5/1997 | Slicker et al. | |
| 5,850,898 A | 12/1998 | Böhme et al. | |
| 6,769,254 B2 | 8/2004 | Heller et al. | |
| 6,889,811 B2 | 5/2005 | Ebert et al. | |
| 6,901,315 B2 | 5/2005 | Köckemann | |
| 7,100,757 B2 | 9/2006 | Gunnerud et al. | |
| 2005/0283298 A1* | 12/2005 | Ochi et al. | 701/67 |
| 2009/0247357 A1* | 10/2009 | Doebele et al. | 477/78 |

FOREIGN PATENT DOCUMENTS

| | | |
|---|---|---|
| DE | 199 18 164 A1 | 10/2000 |
| DE | 100 12 405 A1 | 9/2001 |
| DE | 101 03 843 A1 | 8/2002 |
| DE | 102 05 177 A1 | 8/2002 |
| WO | WO-02/25131 A1 | 3/2002 |
| WO | WO-03/019026 A1 | 3/2003 |

* cited by examiner

*Primary Examiner* — Justin Holmes
(74) *Attorney, Agent, or Firm* — Davis & Bujold, P.L.L.C.

(57) ABSTRACT

A method for controlling an automated friction clutch arranged in a drive train of a motor vehicle in the force flow between a drive engine (3) and a drive transmission (4), which is configured to close passively by spring pressure and can be disengaged and engaged by way of a pressure-medium-actuated clutch actuator (14), such that the actuation position $x\_K$ of the clutch actuator (14) or of an associated transmission element is determined and used for controlling the friction clutch (2). To improve the accuracy and reliability of the clutch actuation it is provided that in addition, an actuating pressure $p\_K$ of the clutch actuator (14) is determined and that a required change of the clutch torque $M\_K$ to a new nominal value $M\_K\_soll$ takes place under pressure control, in that the actuating pressure $p\_K$ of the clutch actuator (14) is set to a nominal value $p\_K\_soll$ which corresponds to the nominal value $M\_K\_soll$ of the clutch torque $M\_K$.

9 Claims, 4 Drawing Sheets

METHOD FOR CONTROLLING AN AUTOMATED FRICTION CLUTCH

This application is a national stage completion of PCT/EP2007/051832 filed Feb. 27, 2007, which claims priority from German Application Serial No. 10 2006 014 141.5 filed Mar. 28, 2006.

FIELD OF THE INVENTION

The invention concerns a method for controlling an automated friction clutch arranged in a drive train of a motor vehicle in the force flow, between a drive engine and a drive transmission. The clutch is designed to be passively closed and engaged or disengaged by a pressure-medium-actuated clutch actuator, wherein the actuating position of the clutch actuator or an associated transmission element is detected and used for controlling the friction clutch.

BACKGROUND OF THE INVENTION

Automated friction clutches of the above type are mainly formed as dry clutches with at least one drive disk, with contact being maintained by the spring pressure of at least one contact pressure spring, since this type of structure is particularly well developed and robust and since its axial structural length is short. In the rest condition when no actuating force is applied, its operating status is engaged, this clutch structure also enables the motor vehicle concerned to be parked safely by engaging a gear in addition to putting on the parking brake.

The friction clutch is, in each case, disengaged mainly in order to bridge speed differences between the drive engine of the motor vehicle and the input shaft of the transmission when starting off and after gear shifts, as well as for carrying out gear shifts not under load, and is then engaged in a controlled manner, such that the respective clutch torque, i.e., the torque that can be transmitted momentarily by the friction clutch (clutch capacity), is determined by a hydraulically or pneumatically actuated clutch actuator.

The clutch actuator can be made as a pressure-medium-actuated actuation cylinder arranged outside the friction clutch and whose actuating piston is connected, via a disengagement lever, to a release bearing mounted to move axially on a guide sleeve fixed on the housing, which can be in contact with the spring tabs of a contact pressure spring made as a membrane spring. Alternatively, however, the clutch actuator can also be made as a central release device in which an annular actuating piston of an annular cylindrical actuating cylinder, arranged co-axially with the input shaft of the drive transmission, is connected directly to the release bearing.

In the simplest case, the clutch actuator is made as a simply operating actuating cylinder with an actuating piston, a pressure space and a restoring spring. Such a clutch actuator can be actuated in a simple mariner by way of at least one proportional control valve, in particular a 3/2-way magnetic control valve, comprising a first input connected to a pressure line, a second input connected to a line, which is not pressurized, and an output connected to the pressure space of the clutch actuator. However, it is also feasible here to use at least two timing valves, in particular 2/2-way magnetic timing valves, in each case, with an input connected to the pressure line or the pressureless line and an output connected to the pressure space of the clutch actuator.

The generation of a given clutch torque, for example a relatively large starting torque or a relatively small creeping torque, has until now been done exclusively by path control, i.e., in accordance with a torque characteristic that sets the clutch torque of the friction clutch as a function of the actuation path or the release path of the clutch actuator or of a transmission element, such as a release lever or a release bearing. For this, the corresponding actuation path is determined by a path sensor and the actuating pressure acting in the clutch actuator is changed, i.e., starting from the closed condition increased and starting from the open condition reduced, until the desired value of the actuation path has been reached. During this, if a difference between the actual value of the actuation path and its desired value is detected, then the actuating pressure is increased or reduced, depending on the direction of the difference, until the difference has been eliminated to within a specified tolerance.

Now if there is a large difference between the actual and desired actuation path positions, as can be caused by sticking because of wear, dirt or poor lubrication on the sliding surfaces between the release bearing and the guide sleeve or in a linkage of the release lever, then this results in a large difference between the actuating pressure of the clutch actuator and the associated actuation position. Until now, i.e., in the case of purely path-dependent control, to eliminate this actuation path difference the nominal pressure associated with the desired actuation path position has been correspondingly set too high, which can lead disadvantageously to jerky bridging and so to overrunning of the actuation path difference.

From this standpoint, a starting process is to be regarded as particularly critical, since starting from the open condition and with the starting gear engaged the friction clutch is closed in the direction of the desired starting torque so the actuating pressure of the clutch actuator is correspondingly reduced. In such a case, when a negative actuation path difference with too large an actual position of the actuation or release path occurs, the actuating pressure of the clutch actuator is necessarily reduced to a value lower than the nominal pressure that would correspond to the desired nominal clutch torque. But when the actuation path difference occurring is bridged with jerking and the friction clutch is over-actuated, i.e., closed too far, then at least for a short time a larger clutch torque is transmitted. This can result either in undesired, jerky starting of the motor vehicle or undesired stalling of the drive engine.

Thus, the purpose of the invention is to propose a method for controlling an automated friction clutch of the type mentioned above, where more exact control of the friction clutch is possible and the disadvantages described earlier can be avoided.

SUMMARY OF THE INVENTION

To achieve this objective, for controlling an automated friction clutch, it is proposed that the clutch be arranged in the drive train of a motor vehicle in the force flow, between a drive engine and a drive transmission, and be designed to be closed passively by spring pressure and disengaged or engaged by way of a pressure-medium-actuated clutch actuator, such that the actuation position $x\_K$ of the clutch actuator or an associated transmission element is determined and used for controlling the friction clutch.

It is also provided that, in addition, an actuating pressure $p\_K$ of the clutch actuator is determined and that a desired change of a clutch torque $M\_K$ to a new nominal value $M\_K\_soll$ is carried out under pressure control in that the actuating pressure $p\_K$ of the clutch actuator is adjusted to a nominal value $p\_K\_soll$ that corresponds to the nominal value $M\_K\_soll$ of the clutch torque $M\_K$.

The corresponding pressure difference $\Delta p\_K = p\_K\_soll - p\_K$ is then bridged in the case of clutch actuator control with a proportional valve continuously, and in the case of control with at least two timing valves step by step, by an appropriate number of actuation pulses.

Thanks to the pressure-controlled adjustment of the nominal value of the clutch torque M_K_soll, excessive increase of the clutch torque of the friction clutch and the associated disadvantages of the known control methods are reliably prevented. The specific application range of pressure-dependent control is expediently matched to a structure-related actuating pressure characteristic p_K=f(x_K) of the friction clutch.

Independently of the course of the respective actuating pressure characteristic p_K=f(x_K) of the friction clutch, the change of the clutch torque M_K to a new nominal value M_K_soll can at first take place by path control, and only when the actuation path x_K approaches the nominal position x_K_soll is it carried out under pressure control, since this generally enables a more rapid actuation sequence.

However, it is particularly advantageous to use an actuation sequence of this type with a friction clutch whose actuating pressure characteristic p_K=f(x_K) at first rises with increasing release path x_K, then reaches a relative maximum, and then falls again, so that it does not rise monotonically. Such actuating pressure characteristics are typical for friction clutches whose contact pressure spring is a membrane spring and which have no additional compensation springs to eliminate this effect. Since in that case there is a clear relationship between the actuating pressure p_K and the actuation path x_K and therefore also the clutch torque M_K only in sections, it is particularly preferable in such a case to adjust the nominal torque M_K_soll first by path control and only by pressure control when close to the nominal position x_K_soll.

Likewise, with clutches of any structure but preferably friction clutches with an actuating pressure characteristic p_K=f(x_K) that does not rise monotonically, the clutch torque M_K can be changed to a new nominal value M_K_soll first by path control and only under pressure control when a larger actuation path difference Δx_K=x_K_soll−x_K_ist is observed. If during this no actuation path difference Δx_K=x_K_soll−x_K_ist occurs, the setting of the nominal torque M_K_soll takes place totally under path control by adjusting the associated nominal value x_K_soll of the actuation path x_K, at which the nominal torque M_K_soll is then also reached.

In contrast, in the case of a friction clutch whose actuating pressure characteristic p_K=f(x_K) rises monotonically, the clutch torque M_K can be changed to a new nominal value M_K_soll without restriction, i.e., totally under pressure control from the beginning until the nominal value p_K_soll of the actuating pressure p_K has been reached.

Owing to the high accuracy that can be achieved thereby, the actuating pressure p_K is measured by a pressure sensor connected to the pressure space of the clutch actuator or to a connection line that leads thereto. Alternatively, however, the actuating pressure p_K can be calculated from suitable measured and/or control quantities.

For the pressure-dependent control of the friction clutch, the nominal value p_K_soll of the actuating pressure p_K is expediently determined from a characteristic M_K=f(p_K) stored in a data memory, which associates the clutch torque to a function of the actuating pressure. Alternatively, however, the nominal value p_K_soll of the actuating pressure p_K can be determined from a first characteristic M_K=f(x_K) associating the clutch torque to a function of the actuation path, which is stored in a data memory, and from a second characteristic p_K=f(x_K) associating the actuating pressure to a function of the actuation path, which is also stored in a data memory.

Furthermore, the nominal pressure p_K_soll can also be set as a function of the pressure difference Δp_K=p_K_soll−p_K_ist to be bridged, in that the nominal value p_K_soll of the actuating pressure p_K is determined from a first characteristic M_K=f(x_K) of the clutch torque which is stored in a data memory and from a second characteristic Δx_K=f(Dp_K) of the actuation path change, where Δx_K=x_K_soll−x_K_ist and Δp_K=p_K_soll−p_K_ist, which is also stored in a data memory.

Once the nominal pressure p_K_soll has been reached, in order to reach the nominal position x_K_soll and hence the nominal value M_K_soll of the clutch torque M_K, it is expedient to override the nominal pressure p_K_soll so long as an actuation path difference Δx_K=x_K_soll−x_K_ist is still detectable.

To avoid the disadvantages described earlier, however, such overriding of the nominal pressure p_K_soll in order to reach the nominal position x_K_soll should only take place after the lapse of a waiting period determined in advance, and preferably very slowly.

Moreover, overriding of the nominal pressure p_K_soll to reach the nominal position x_K_soll should only be carried out when certain safety conditions are fulfilled.

For example in this connection, it can be provided that when the vehicle is at rest or driving at a low speed, overriding of the nominal pressure p_K_soll in order to reach the nominal position x_K_soll only takes place when at the same time an actuation of the parking brake, an actuation of the service brake or an actuation of the accelerator pedal in the direction of increased power demand is detected, since in this way jerky starting and undesired acceleration of the motor vehicle, or stalling of the drive engine, can be prevented.

Overriding of the nominal pressure p_K_soll to reach the nominal position x_K_soll is preferably carried out cyclically, such that the actuating pressure p_K, in each case, is brought back down to the nominal pressure p_K_soll since, in this way, any sticking that may have occurred can be released as soon as possible. During this, the frequency and/or the pressure amplitude of the cyclic overriding of the nominal pressure p_K_soll is preferably increased with increasing actuation path difference Δx_K=x_K_soll−x_K_ist. To produce the cyclic overriding of the nominal pressure p_K_soll, in practice a proportional valve associated with the clutch actuator is actuated in alternating directions and associated pressure-increasing and pressure-reducing stroke valves are actuated in alternation.

BRIEF DESCRIPTION OF THE DRAWINGS

The invention will now be described, by way of example, with reference to the accompanying drawings in which.

DETAILED DESCRIPTION OF THE INVENTION

Figure 3:
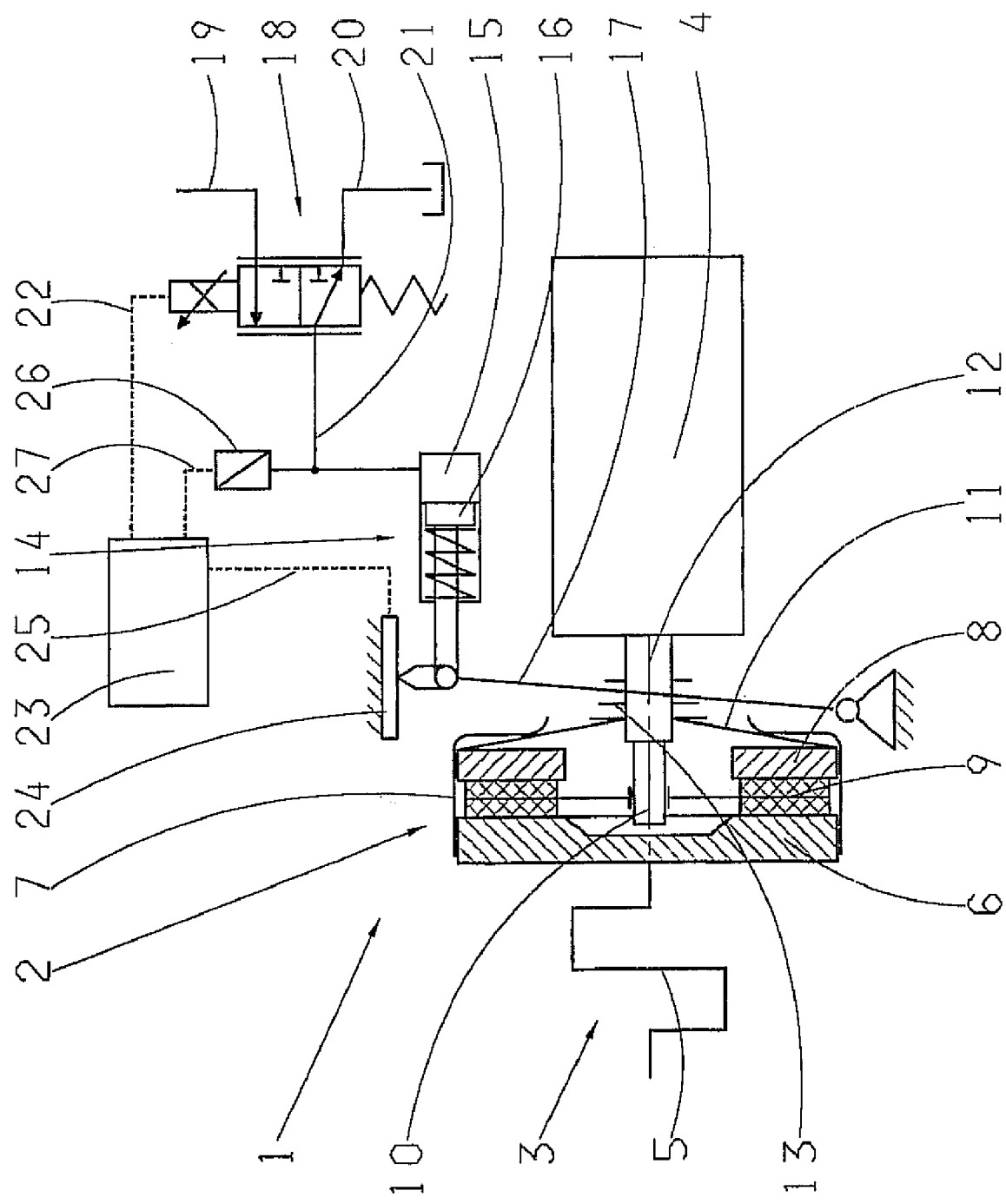
FIG. 3 is a first clutch arrangement for implementing the method according to the invention.

FIG. 3 illustrates a first clutch arrangement 1 for implementing the method according to the invention. The Figure shows a friction clutch 2 made as a single-disk dry clutch in the force flow between a drive engine 3 made as a piston-powered internal combustion engine and a drive transmission 4.

The input-side part of the friction clutch 2 is formed by a flywheel 6 attached to a crankshaft 5 of the drive engine 3, and a pressure plate 8 connected to this by a clutch cage 7. The output-side part of the friction clutch 2 is formed by a drive disk 9 arranged axially between the flywheel 6 and the pressure plate 8, which is mounted in a rotationally fixed manner, but able to move axially, on an input shaft 10 of the drive transmission 4. By virtue of a contact pressure spring 11 made as a membrane spring and arranged between the clutch cage 7 and the pressure plate 8, in its rest condition with no actuating force the Friction clutch 2 is closed and can be disengaged and engaged by way of a release bearing 13 mounted to move axially on a guide sleeve 12 fixed on the housing, which rests against radially inner spring tabs of the contact pressure spring 11.

The release bearing 13 is actuated and a desired clutch torque $M\_K\_soll$ of the friction clutch 2 is thereby set by way of a pressure-medium-actuated clutch actuator 14 which, in the present case, is a simply-acting actuating cylinder with an actuating piston 16 mounted to move axially, which can be displaced against the restoring force of a restoring spring by an actuating pressure $p\_K$ produced in a pressure space 15. The actuating piston 16 with its piston rod is connected, via a release lever 17 mounted to swivel on the housing, to the release bearing 13 in such a manner that increasing actuating pressure $p\_K$ leads to disengagement of the friction clutch 2 and thus to a reduction of the clutch torque $M\_K$.

The clutch actuator 14 itself is actuated by a control valve 18 which, in the present case, is formed as a 3/2-way proportion magnetic valves with two inputs and one output, the first input being connected to a pressure line 19, the second input to a pressureless line 20 and the output, via a connecting line 21, to the pressure space of the clutch actuator 14.

To actuate an control valve 18, it is connected by an electric control line 22 to a control unit 23. Thus, by virtue of the structure a change of the clutch torque $M\_K$ takes place by a continuous variation of the actuating pressure $p\_K$ of the clutch actuator 14.

To detect an actuation position $x\_K$ of the actuating piston 16 or the release lever 17, in the area of the piston rod of the actuating piston 16 there is arranged a path sensor 24, which is connected to the control unit 23 via at sensor lead 25. To measure the actuating pressure $p\_K$ of the clutch actuator 14, a pressure sensor 26 is connected to the connecting line 21, which is connected to the control unit 23 by a sensor lead 27. Thus, in principle both path-dependent and pressure-dependent control of the friction clutch 2 are possible.

Figure 4:
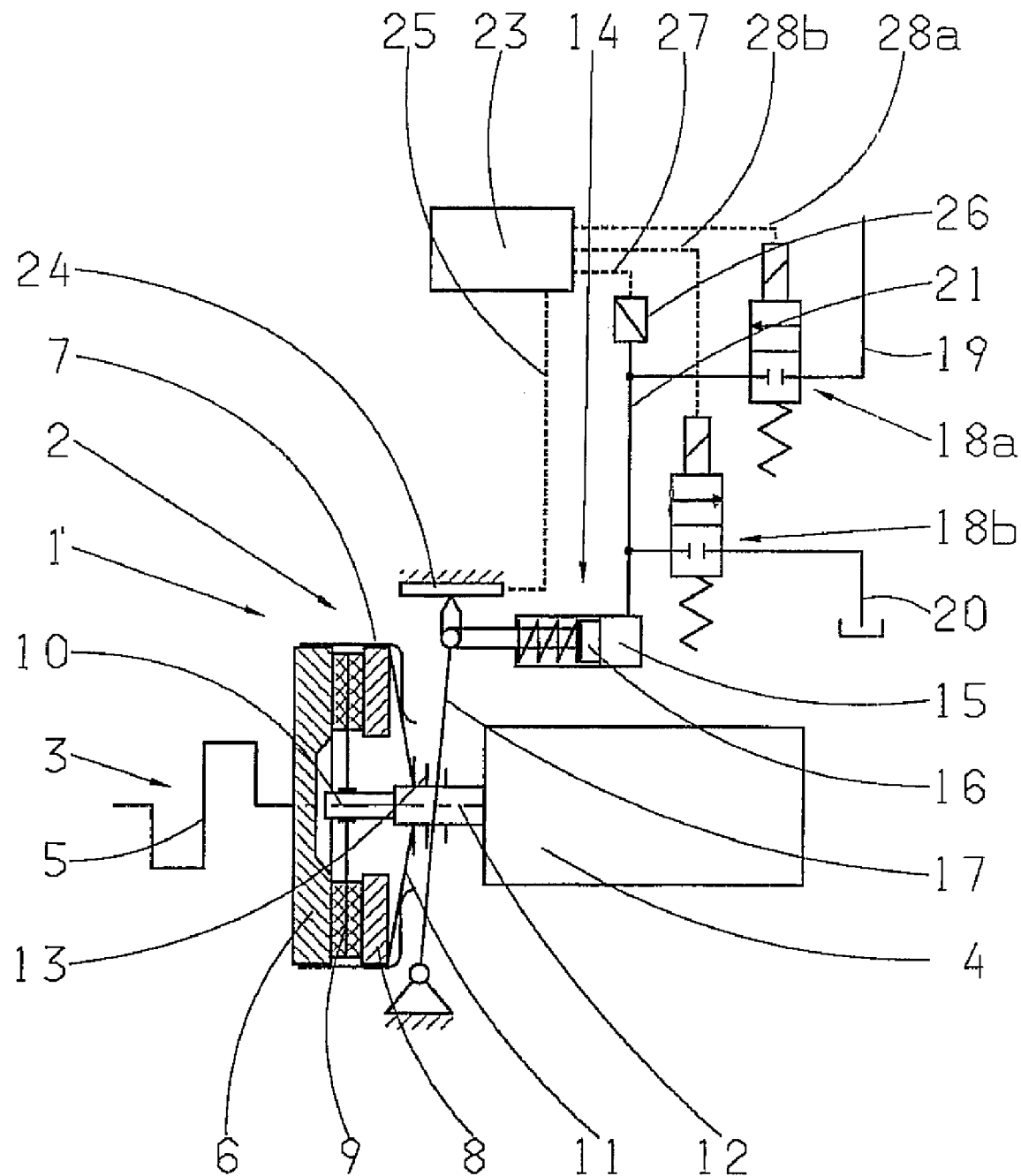
FIG. 4 is a second clutch arrangement for implementing the method according to the invention.

In another clutch arrangement 1', shown in FIG. 4, which in other respects has the same structure and configuration as the clutch arrangement 1 of FIG. 3, the difference is that for controlling the clutch actuator 14, two control valves 18*a* and 18*b* are provided, each made as a 2/2-way magnetic timing valve with one input and one output. The input of the first timing valve 18*a* is connected to the pressure line 19 and its output, via the connecting line 21, to the pressure space 15 of the clutch actuator 14. The input of the second tinning valve 18*b* is connected to the pressureless line 20 and its output, via the connecting line 21, to the pressure space 15 of the clutch actuator 14. Via respective electric control lines 22*a* and 22*b*, the two timing valves 18*a* and 18*b* are connected to the control unit 23. In this case, by virtue of the structure a change of the clutch torque $M\_K$ takes place by stepwise variation of the actuating pressure $p\_K$.

Figure 1:
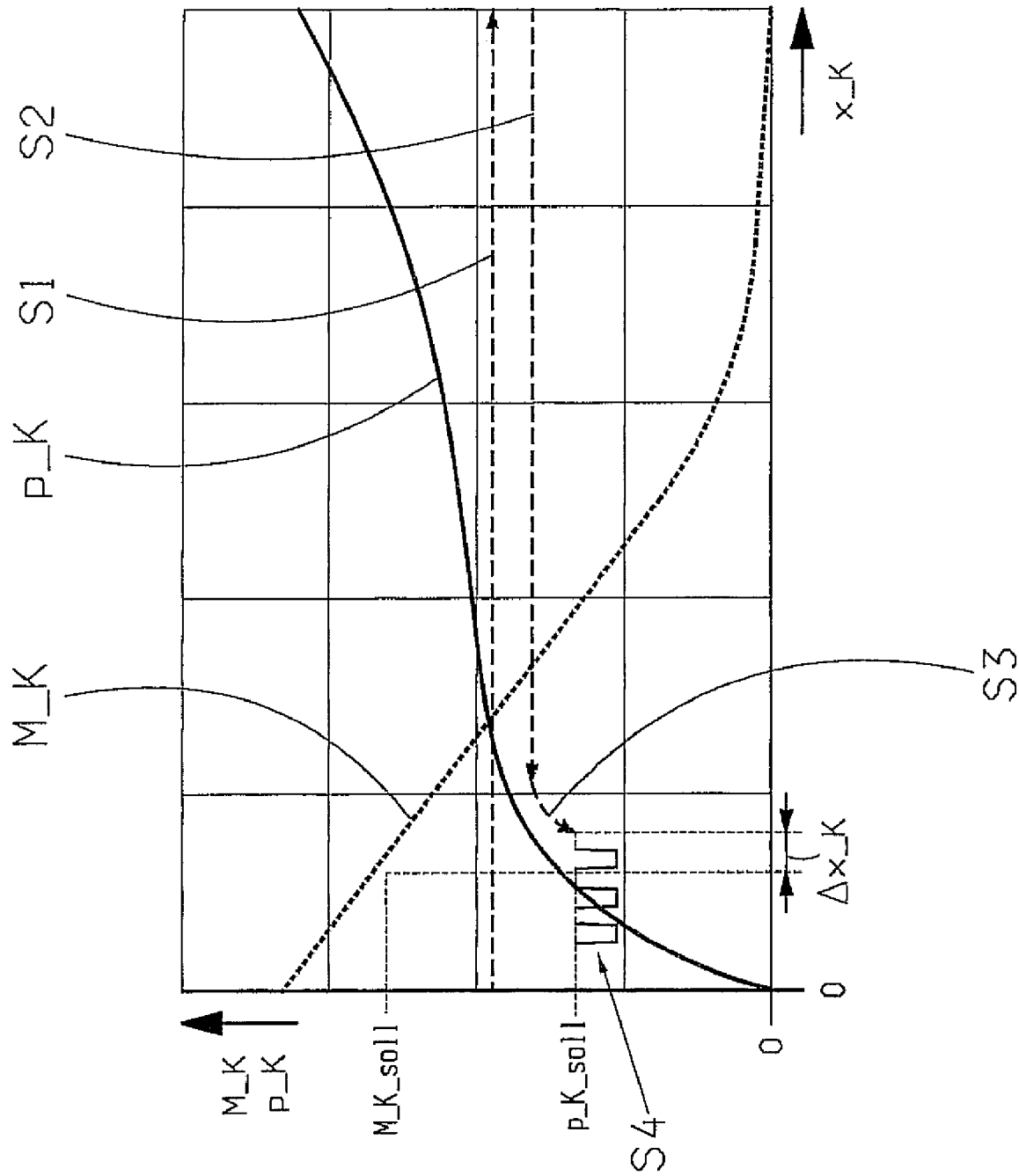
FIG. 1 is a diagram of the clutch torque of a friction clutch and of the actuating pressure of an associated clutch actuator, in each case as a function of actuation path.

In the diagram of FIG. 1 examples of the variations of the clutch $M\_K$ and the actuating pressure $p\_K$, in each case as a function of the actuation path $x\_K$, which, in this case, is identical to the release path of the clutch actuator 14 or the release lever 17, are shown for the clutch arrangements 1 according to FIGS. 3 and 1' according to FIG. 4.

The course of a clutch torque $M\_K=f(x\_K)$ falls monotonically and that of an actuating pressure $p\_K=f(x\_K)$ rises monotonically, so that in each case a clear relation exists or can be derived between the clutch torque $M\_K$, the actuating pressure $p\_K$ and the actuation path $x\_K$. Thus, as an alternative to the previous, purely path-dependent control, a particular clutch torque $M\_K$ could also be set completely under pressure control. However, to accelerate the control sequence it is provided that the coarse control, i.e., the control until the corresponding nominal position $x\_K\_soll$ of the actuation path $x\_K$ is approached and/or until a larger actuation path difference $\Delta x\_K = x\_K\_soll - x\_K\_ist$ is detected is, at first, carried out under path control and only after that under pressure control.

Figure 2:
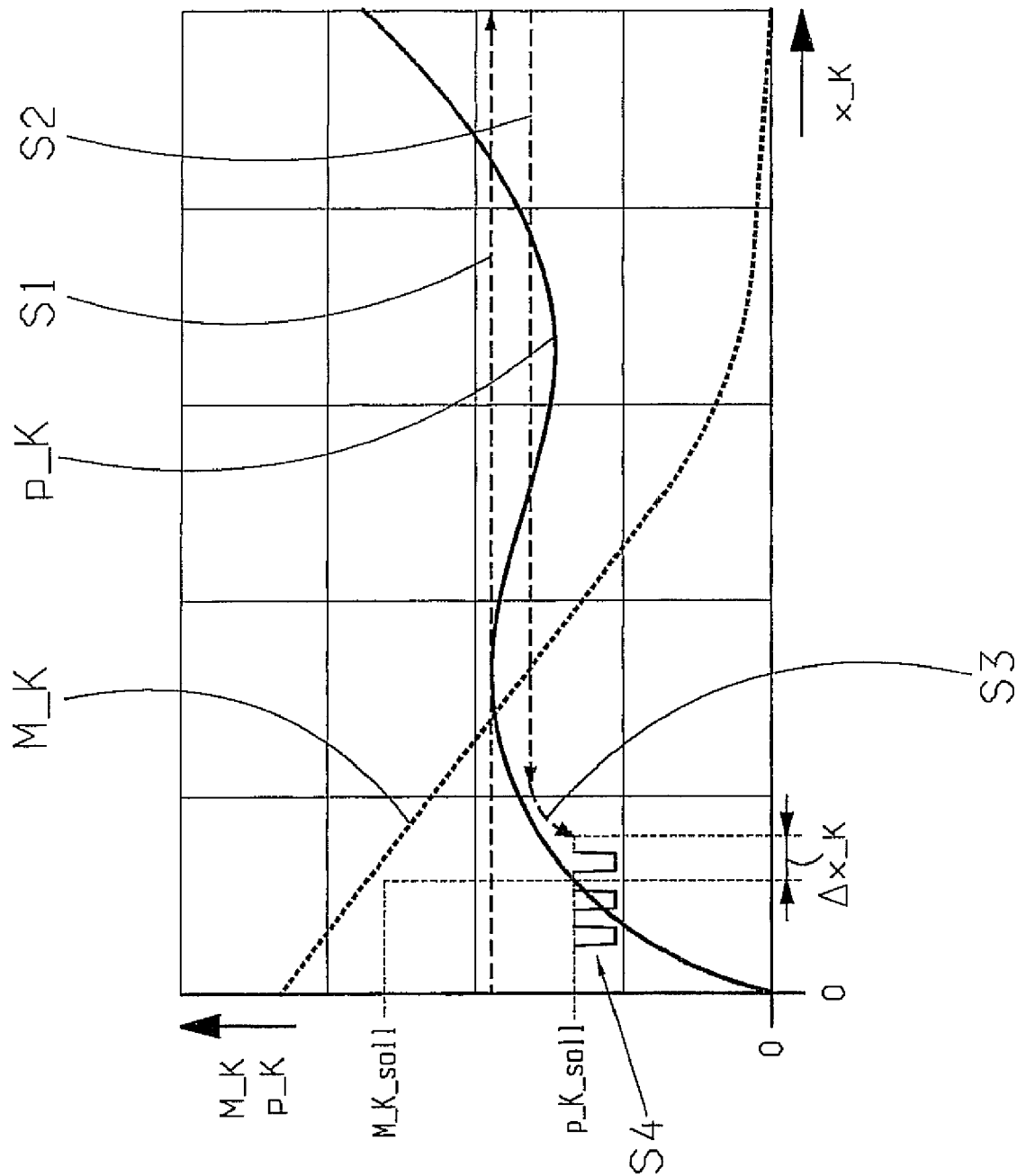
FIG. 2 is a diagram of the clutch torque of another friction clutch and of the actuating pressure of an associated clutch actuator, in each case as a function of actuation path.

This procedure also has the advantage that it can also be used for friction clutches 2 whose actuating pressure characteristic $p\_K=f(x\_K)$ does not rise monotonically, such as friction clutches 2 with a contact pressure spring 11 made as a membrane spring without further compensation springs. FIG. 2 illustrates an example of a corresponding graph of the actuating pressure characteristic $p\_K=f(x\_K)$ together with the associated variation of the clutch torque $M\_K=f(x\_K)$.

The two graphs of FIGS. 1 and 2 each make clear how a given clutch torque $M\_K\_soll$ for starting is set. First, in step S1, the friction clutch is completely disengaged under path control (broken line with an arrow pointing right). Then the starting gear is engaged and in step S2 (broken line with arrows pointing left) the friction clutch 2 is engaged under path control until the actual position $x\_K\_ist$ of the actuation path $x\_K$ is close to a nominal position $x\_K\_soll$, or until a larger actuation path difference $\Delta x\_K = x\_K\_soll - x\_K\_ist$ is detected.

Thereafter, the further clutch actuation is carried out under pressure control, in that in step S3 the nominal pressure $p\_K\_soll$ associated with the nominal torque $M\_K\_soll$ is set in the clutch actuator 14. Once the nominal pressure $p\_K\_soll$ has been reached, if there is still an actuation path difference $\Delta x\_K = x\_K\_soll - x\_K\_ist$, then in step S4 the nominal pressure $p\_K\_soll$ is overridden in order to reach the nominal piston $x\_K\_soll$.

This overriding of the nominal pressure $p\_K\_soll$ is preferably carried out in the form of cyclic pressure changes such that the actuating pressure $p\_K$ is in each case returned back to the nominal pressure $p\_K\_soll$, in order to avoid an undesired overrun of the actuation path $x\_K\_soll$ and thus of the clutch torque $M\_K\_soll$ as well, which can be caused by a sudden release of the deadlock for example of the release bearing 13 on the guide sleeve 12.

REFERENCE NUMERALS 1 clutch arrangement
1' clutch arrangement
2 friction clutch
3 drive engine
4 drive transmission
5 crankshaft
6 flywheel
7 clutch cage
8 pressure plate
9 drive disk 10 input shaft
11 contact pressure spring
12 guide sleeve
13 release bearing
14 clutch actuator
15 pressure space
16 actuating piston
17 release lever
18 control valve
18a control valve
18b control valve
19 pressure line
20 pressureless line
21 connecting line
22 control line
22a control line
22b control line
23 control line
24 path sensor
25 sensor lead
26 pressure sensor
27 sensor lead
M_K clutch torque
M_K_ist actual torque, actual value of M_K
M_K_soll nominal torque, nominal value of M_K
p_K actuating pressure
p_K_ist actual pressure, actual value of p_K
Δp_K change of actuating pressure
S1 step 1
S2 step 2
S3 step 3
S4 step 4
x_K actuation path, actuation position
x_K_ist actual position, actual value of x_K
x_K_soll nominal position, nominal value of x_K
Δx_K actuation path difference, actuation path change

The invention claimed is:

1. A method for controlling an automated friction clutch arranged in a drive train of a motor vehicle in the force flow between a drive engine (3) and a drive transmission (4), which is configured to be passively engaged by spring pressure and can be disengaged or engaged by means of a pressure-medium-actuated clutch actuator (14), such that an actuation position (x_K) of the clutch actuator (14) or of an associated transmission element is determined and used for controlling the friction clutch (2), and in addition an actuating pressure (p_K) of the clutch actuator (14) is determined, and a required change of a clutch torque (M_K) to a new nominal value (M_K_soll) takes place under pressure control, and the actuating pressure (p_K) of the clutch actuator (14) is adjusted to a nominal value (p_K_soll) which corresponds to the nominal value (M_K_soll) of the clutch torque (M_K), the method comprising the steps of:
setting the nominal pressure (p_K_soll), and
then, upon detecting an actuation path difference (Δx_K=x_K_soll−x_K_ist), overriding the nominal pressure (p_K_soll) in order to reach a nominal position (x_K_soll).

2. The method according to claim 1, further comprising the step of the overriding of the nominal pressure (p_K_soll) to reach the nominal position (x_K_soll) only takes place after the lapse of a predetermined waiting time.

3. The method according to claim 1, further comprising the step of the overriding of the nominal pressure (p_K_soll) to reach the nominal position (x_K_soll) takes place only slowly.

4. The method according to claim 1, further comprising the step of the overriding of the nominal pressure (p_K_soll) to reach the nominal position (x_K_soll) takes place only if certain safety conditions are fulfilled.

5. The method according to claim 4, further comprising the step of the overriding of the nominal pressure (p_K_soll) to reach the nominal position (x_K_soll) takes place when the vehicle is at rest or driving at a low speed, only if at the same time an actuation of a parking brake is sensed.

6. The method according to claim 4, further comprising the step of the overriding of the nominal pressure (p_K_soll) to reach the nominal position (x_K_soll) takes place when the vehicle is at rest or driving at a low speed, only if at the same time an actuation of a service brake is sensed.

7. The method according to claim 4, further comprising the step of the overriding of the nominal pressure (p_K_soll) to reach the nominal position (x_K_soll) takes place when the vehicle is at rest or driving at a low speed, only if at the same time an actuation of a acceleration pedal in the direction of an increased power demand is sensed.

8. The method according to claim 4, further comprising the step of, to reach the nominal position (x_K_soll) cyclic, carrying out the overriding of the nominal pressure (p_K_soll) and returning the actuating pressure (p_K) back to the nominal pressure (p_K_soll).

9. The method according to claim 8, further comprising the step of increasing the frequency and/or the pressure amplitude of a cyclic overriding of the nominal pressure (p_K_soll) with increasing actuation path difference (Δx_K=x_K_soll−x_K-ist).

* * * * *